United States Patent [19]

Tanaka et al.

[11] Patent Number: 5,643,683
[45] Date of Patent: Jul. 1, 1997

[54] WET TYPE SLIDING APPARATUS

[75] Inventors: Tadashi Tanaka; Hidehiko Tamura; Takahiro Niwa; Izumi Maruyama; Yoshihiro Fukutani, all of Nagoya, Japan

[73] Assignee: Daido Metal Company Ltd., Nagoya, Japan

[21] Appl. No.: 590,764

[22] Filed: Jan. 24, 1996

[30] Foreign Application Priority Data

Feb. 1, 1995 [JP] Japan ................... 7-037607

[51] Int. Cl.$^6$ ................................. B22F 7/04
[52] U.S. Cl. .................. 428/551; 428/539.5; 428/548; 428/550; 428/553; 428/554; 428/555; 428/558
[58] Field of Search ................. 428/539.5, 546, 428/548, 550, 551, 553, 554, 555, 556, 558, 566, 568

[56] References Cited

U.S. PATENT DOCUMENTS

| | | | |
|---|---|---|---|
| 2,995,462 | 8/1961 | Mitchell et al. | 117/8 |
| 3,705,450 | 12/1972 | Morisaki | 29/182.3 |
| 4,421,588 | 12/1983 | Davies | 156/308.2 |
| 4,592,782 | 6/1986 | Davies | 75/253 |
| 4,623,153 | 11/1986 | Nagasawa | 277/153 |
| 4,623,590 | 11/1986 | Hodes et al. | 428/408 |
| 4,767,677 | 8/1988 | Kuwayama | 428/551 |
| 4,847,135 | 7/1989 | Braus et al. | 428/138 |
| 4,865,922 | 9/1989 | Davies | 428/551 |
| 4,923,761 | 5/1990 | Shindo | 428/550 |
| 5,229,198 | 7/1993 | Schroeder | 428/256 |
| 5,415,791 | 5/1995 | Chou et al. | 252/12 |
| 5,447,774 | 9/1995 | Tanaka et al. | 428/141 |

FOREIGN PATENT DOCUMENTS

| | | |
|---|---|---|
| 0394518 | 10/1990 | European Pat. Off. . |
| 63-297457 | 5/1988 | Japan . |
| 1-108413 | 4/1989 | Japan . |

Primary Examiner—Peter A. Nelson
Assistant Examiner—Chrisman D. Carroll
Attorney, Agent, or Firm—Browdy and Neimark

[57] ABSTRACT

A wet type sliding apparatus in which a multilayer sliding member is used in the presence of a lubricating oil, characterized in that the multilayer sliding member is composed of (1) a backing metal layer, (2) a porous, sintered layer provided thereon and (3) a surface layer consisting essentially of polyetheretherketone formed by impregnating and coating the porous, sintered layer with a sliding resin consisting essentially of polyetheretherketone. The above sliding member has a small friction coefficient and excellent wear resistance. In particular, the sliding noise can be more effectively inhibited by adjusting the face roughness of the surface layer of the sliding member to 2 μm or less.

9 Claims, 1 Drawing Sheet

WET TYPE SLIDING APPARATUS

BACKGROUND OF THE INVENTION

This invention relates to a wet type sliding apparatus, more particularly, to a wet type sliding apparatus which comprises a wet type sliding member having excellent sliding characteristics. The wet type sliding apparatus in which a lubricating oil is used at the sliding surface includes compressor, hydraulic pump, hydraulic cylinder, shock absorber, geared motor and the like.

This invention further relates to an improved wet type sliding apparatus in which a specific multilayer sliding member is used in the presence of an oil.

A multilayer sliding member in which a backing metal is coated with a sliding resin is used in a so-called dry type sliding apparatus in which, for example, a lubricating oil is not used, and various improvements have been made on a sliding resin constituting the surface layer of the sliding member in order to enhance sliding characteristics such as friction properties, wear resistance and the like, of the sliding member. Among the polyether aromatic ketones, polyetheretherketone (referred to hereinafter as PEEK) has been studied as to whether or not it can be adopted as a sliding resin for a dry type sliding member because of its excellent friction properties, wear resistance and the like. For example, Japanese Patent Application Kokai No. 63-297,457 (referred to hereinafter as Prior Art 1) discloses a sliding resin composition comprising 99 to 80% by weight of PEEK and 1 to 20% by weight of a metal fluoride as a filler and describes that a bearing having excellent wear resistance can be formed therefrom. Japanese Patent Application Kokai No. 1-108,413 (referred to hereinafter as Prior Art 2) describes that a sliding member having low friction and excellent wear resistance can be formed from a sliding resin composition comprising 30 to 98 by weight PEEK, 1 to 35% by weight of polytetrafluoroethylene (referred to hereinafter as PTFE) as a filler and 1 to 35% by weight of a metal fluoride as a filler.

In Prior Art 1 and Prior Art 2, the application of PEEK to a sliding member to be used in the dry type sliding apparatus is discussed, and it is described that a sliding member consisting of 100% by weight of PEEK has a large friction coefficient, and hence, PEEK cannot be used alone as a sliding member. This is stated on page 1, the lower right column, line 11 to page 2, the upper left column, line 7 of Prior Art 1 and also as Comparative Example 6 in Table 1 of Prior Art 1, and it is stated there that a sliding member consisting of 100% by weight of PEEK is inferior in friction coefficient and wear resistance and hence required to contain various solid fillers in addition to the PEEK.

However, in the field of a wet type sliding apparatus in which a sliding member is used in the presence of a lubricating oil, for example, a compressor or the like, there has recently become required a sliding member (bearing) capable of reducing the consumed electric power and minimizing noise, and particularly as to the noise, even a frictional noise as generated when a shaft is rotated in a bearing has become a problem.

The present inventors have made extensive research to solve the above problems and, as a result, have surprisingly found that when a sliding resin consisting essentially of PEEK is used alone as a sliding resin for a sliding member in the wet type sliding apparatus, the results obtained are quite different from those obtained under the dry type sliding conditions. This invention is based on the above knowledge.

SUMMARY OF THE INVENTION

It is an object of this invention to provide a wet type sliding apparatus comprising a multilayer sliding member which contains a sliding resin consisting essentially of PEEK and has excellent friction properties.

It is another object of this invention to provide a wet type sliding apparatus in which a specific multilayer sliding member is used in the presence of a lubricating oil.

It is still another object of this invention to provide the above-mentioned wet type sliding apparatus wherein the roughness of the surface (referred to hereinafter as the face roughness) of the surface layer of the above-mentioned multilayer sliding member is 2 μm or less.

It is a further object of this invention to provide the above-mentioned wet type sliding apparatus wherein the surface of the surface layer of the above-mentioned multilayer sliding member is cut so as to have a face roughness of 2 μm or less.

Other objects and advantages of this invention will become apparent from the following description.

According to this invention, there is provided a wet type sliding apparatus in which a wet type multilayer sliding member which has a small friction coefficient and excellent wear resistance is used, characterized in that the said multilayer sliding member is composed of (1) a backing metal layer, (2) a porous, sintered layer provided on the backing metal layer (1) and (3) a surface layer consisting essentially of polyetheretherketone formed by impregnating and coating the porous, sintered layer (2) with a sliding resin consisting essentially of polyetheretherketone.

BRIEF DESCRIPTION OF THE DRAWING

In FIG. 1, 1 refers to a backing metal layer, 2 to a porous, sintered layer, and 3 to a surface layer consisting essentially of PEEK.

In FIG. 2, 4 refers to a bush (bearing), 5 to a bearing cover, 6 to a crank shaft, 7 to a connecting rod, 8 to a piston, 9 to a cylinder, 10 to a oil pan, 11 to lubricating oil and 12 to a rod for diffusing the lubricating oil. In the present invention, for example, the multilayer sliding member shown in FIG. 1 is used in the cylindrical bush 4 shown in FIG. 2.

DETAILED DESCRIPTION OF THE INVENTION

Figure 1:
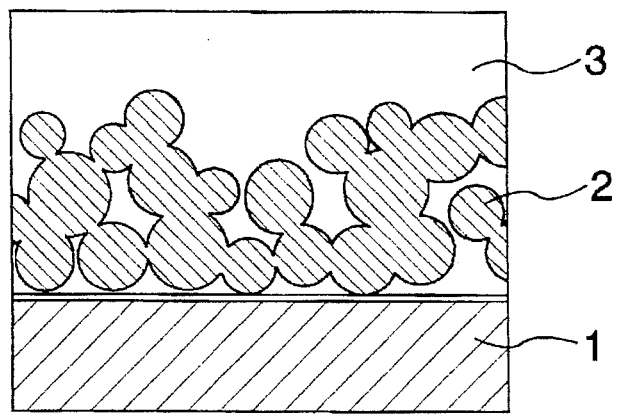
FIG. 1 is a sectional view of a multilayer sliding member used in the wet type sliding apparatus of this invention.
Figure 2:
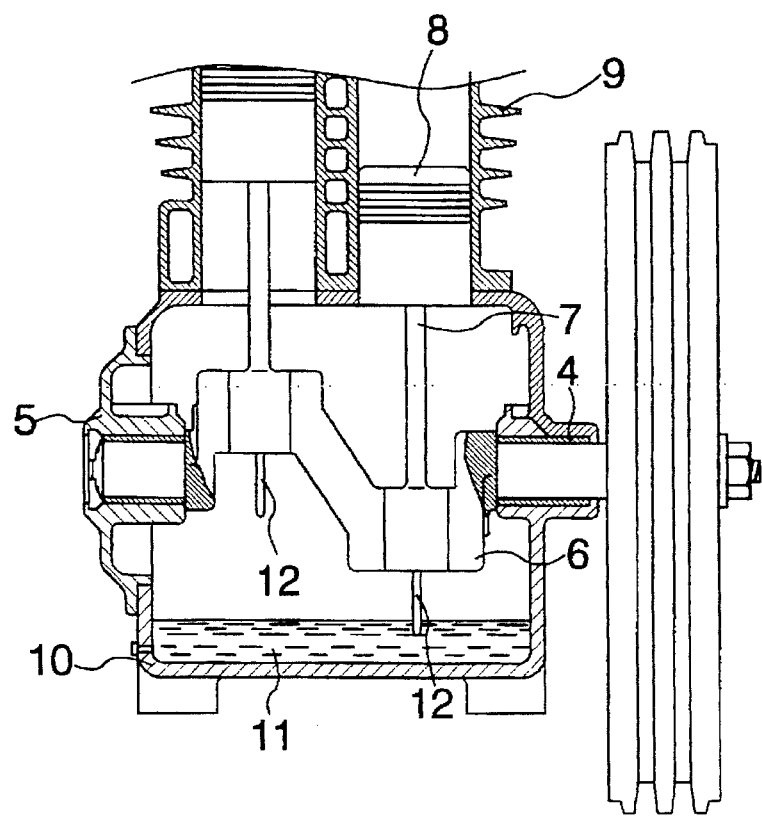
FIG. 2 shows a compressor as an example of the wet type sliding apparatus using a lubricating oil.

In the process of producing a multilayer sliding member which is used in this invention, a finish processing has been applied to the surface layer of the multilayer sliding member for heightening the dimensional accuracy of the surface layer. By this finish processing, the face roughness of the surface layer can be made small and the friction properties can be made much better. In particular, when the surface of the surface layer is finished so as to have a face roughness of 2 μm or less, the noise can be remarkably inhibited, so that the face roughness of 2 μm or less is preferred.

Incidentally, as the finish processing, any of such processings as cut processing, polish processing and the like can be adopted. However, the finishing of the surface by a cut processing is easier than by the other processings.

When the surface layer of the sliding member of Prior Art 1 or Prior Art 2 is finished by a cut processing, the filler contained in PEEK falls off or the PTFE contained in PEEK elongates in the form of whiskers, so that it is impossible to make the face roughness sufficiently small. Therefore, there is a limit in improving the friction properties in the case of the prior art sliding member. On the other hand, the surface of the surface layer consisting essentially of PEEK, i.e. substantially free of filler and PTFE, of the sliding member used in this invention can easily be cut to a face roughness of 2 μm or less by appropriately adjusting the cutting speed and the feed rate.

The wet type sliding apparatus of this invention is an improved wet type sliding apparatus in which an improved sliding member has been used in the presence of a lubricating oil. In general, wet type sliding apparatuses have a mechanism of feeding a lubricating oil to the sliding face of the sliding member. Such wet type sliding apparatuses include, for example, compressor, hydraulic pump, hydraulic cylinder, shock absorber, geared motor and the like.

When the sliding member is a bearing having a half cylindrical shape or a complete cylindrical shape, the desired clearance can be formed with accuracy between the sliding member and the shaft by cut processing by means of a lathe.

As explained above, in the wet type sliding apparatus of this invention, the sliding member is composed of (1) a backing metal layer, (2) a porous, sintered layer formed on the backing metal layer (1) and (3) a surface layer consisting essentially of PEEK formed by impregnating and coating the porous, sintered layer (2) with a sliding resin consisting essentially of PEEK and hence has a small friction coefficient and excellent wear resistance.

By adjusting the face roughness of the surface layer of the multilayer sliding member to 2 μm or less, the generation of noise can be more effectively inhibited at the time of sliding.

Such a sliding member can be easily prepared by forming a porous, sintered layer on a backing metal layer, forming a surface layer consisting essentially of PEEK, by impregnation and coating with a sliding resin consisting essentially of PEEK, on the porous, sintered layer and then, subjecting the surface layer to cut processing to finish the surface so as to have a face roughness of 2 μm or less.

DESCRIPTION OF THE PREFERRED EMBODIMENTS

Examples and Comparative Examples are shown below to explain this invention in more detail.

In order to confirm the effect of this invention, sliding members (test samples) to be used in Examples 1 and 2 and Comparative Examples 1 to 10 were prepared as follows:

A bronze powder was spreaded in a thickness of 0.3 mm on a copper-plated backing steel having a thickness of 0.8 mm and sintered to form a porous, sintered layer. On the other hand, uniformly compounded resin pellets having the composition shown in Table 1 were extruded by a sheet-extruder to form a resin sheet having a thickness of 0.4 mm. In this case, the resin used was PEEK 450 G (a trade name of ICI in G.B. for PEEK having a melt flow index of 3.1 g/10 min).

TABLE 1

| | Composition of the surface layer of sliding member | | | | | |
|---|---|---|---|---|---|---|
| | PEEK | PTFE | PbF$_2$ | CaF$_2$ | K$_2$TiO$_3$ fiber | Graphite |
| Example 1 | 100 | — | — | — | — | — |
| Example 2 | 100 | — | — | — | — | — |
| Comp. Ex. 1 | 90 | — | 10 | — | — | — |
| Comp. Ex. 2 | 90 | 10 | — | — | — | — |

TABLE 1-continued

| | Composition of the surface layer of sliding member | | | | | |
|---|---|---|---|---|---|---|
| | PEEK | PTFE | PbF$_2$ | CaF$_2$ | K$_2$TiO$_3$ fiber | Graphite |
| Comp. Ex. 3 | 90 | — | — | 10 | — | — |
| Comp. Ex. 4 | 95 | — | — | — | 5 | — |
| Comp. Ex. 5 | 95 | — | — | — | — | 5 |
| Comp. Ex. 6 | 80 | 10 | 10 | — | — | — |
| Comp. Ex. 7 | 70 | 10 | — | 10 | 10 | — |
| Comp. Ex. 8 | 76 | 20 | — | 2 | 2 | — |
| Comp. Ex. 9 | 55 | 10 | — | 20 | 15 | — |
| Comp. Ex. 10 | 69 | 5 | 15 | — | 10 | 1 |

The resin sheet obtained was put on the porous, sintered layer in the state that the porous, sintered layer was heated at a temperature of 350° to 400° C. and the resulting assembly was pressed between rolls to impregnate and coat the porous, sintered layer with the resin, thereby forming a multilayer sheet having a thickness of 1.5 mm. This sheet was cut and thereafter formed into a cylinder having an inner diameter of 20 mm and a length of 20 mm. Thereafter, the resulting cylinder was bored and cut by means of a general purpose lathe so that the internal cross-section of the cylinder became a complete circle. The bite used was made of natural diamond, the revolution speed was 160 m/min and the feed rate was 0.09 mm/rev. In the above manner, bearings (multilayer sliding members) to be used in Example 1 and Comparative Examples 1 to 10 were prepared. Incidentally, in Example 2, the bite used was made of synthetic diamond, the revolution speed was 160 m/min and the feed rate was 0.09 mm/rev.

The thus obtained sliding members for Examples 1 and 2 and Comparative Examples 1 to 10 were cut, the maximum difference of altitude ($R_{max}$) (μm) between the concave and convex portions at the surface of the surface layer was measured and indicated as the face roughness after the cutting.

Subsequently, the sliding member obtained was placed in a wet type sliding apparatus and subjected to a sliding test (a frictional wear test) under the conditions shown in Table 2.

TABLE 2

| Frictional wear test conditions | |
|---|---|
| Tester used | Cylindrical-shaped bearing tester |
| Dimension of test sample | 20 mm in inner diameter × 20 mm in length × 1.5 mm in thickness |
| Load | 10 MPa |
| Pheripheral speed | 0.05 m/sec |
| Test time | 100 hrs. |
| Lubricating oil | Kerosine |
| Test temperature | Room temperature |

In this case, the time (min) taken until the friction coefficient became steady was taken as an adapting time. Also, as in the measurement of the face roughness after the cutting, each test sample (sliding member) after the sliding test was cut and subjected to measurement of maximum difference of altitude ($R_{max}$) (μm) between the convex and concave portions at the surface of the sliding member. The maximum difference of altitude obtained is indicated as a face roughness after the sliding test.

The results of these tests are shown in Table 3, including face roughness after the cutting.

TABLE 3

| | Face roughness after cutting $R_{max}$ (μm) | Adapting time (min) | Friction coefficient | Amount of wear (μm) | Face roughness after test $R_{max}$ (μm) |
|---|---|---|---|---|---|
| Example 1 | 1.2 | 10 | 0.150 | 15 | 0.6 |
| Example 2 | 2.0 | 13 | 0.158 | 19 | 1.0 |
| Comp. Ex. 1 | 2.8 | 22 | 0.212 | 36 | 1.8 |
| Comp. Ex. 2 | 2.9 | 25 | 0.215 | 35 | 1.5 |
| Comp. Ex. 3 | 3.2 | 20 | 0.204 | 39 | 1.1 |
| Comp. Ex. 4 | 3.1 | 28 | 0.224 | 34 | 1.9 |
| Comp. Ex. 5 | 2.6 | 20 | 0.211 | 37 | 1.2 |
| Comp. Ex. 6 | 3.2 | 24 | 0.201 | 35 | 1.6 |
| Comp. Ex. 7 | 3.3 | 24 | 0.199 | 37 | 1.8 |
| Comp. Ex. 8 | 4.0 | 21 | 0.196 | 38 | 1.7 |
| Comp. Ex. 9 | 3.3 | 32 | 0.211 | 31 | 1.8 |
| Comp. Ex. 10 | 3.0 | 30 | 0.220 | 35 | 1.7 |

From the results shown in Table 3, it can be seen that the face roughness ($R_{max}$) after the cutting was 1.2 μm in Example 1 and 2.0 μm in Example 2. This means that the sliding members in Examples 1 and 2 were smoothly cut. On the other hand, in each of Comparative Examples 1 to 10, the face roughness was at least 2.6 μm. That is to say, the face roughness was large in Comparative Examples 1 to 10. In Examples 1 and 2, the adapting times were as short as 10 min and 13 min, respectively, and the face roughnesses after the sliding test were 0.6 μm and 1.0 μm, respectively, which means that the surfaces of the sliding members became very smooth. On the other hand, in Comparative Examples 1 to 10, the adapting times were at least 20 min and the face roughnesses after the sliding test were at least 1.1 μm and were 2–3 times higher than in Example 1. Incidentally, the noise (sliding noise) generated during the frictional wear test was confirmed aurally. However, it was confirmed thereby that the loudness of the noise depends upon the face roughness.

In Examples 1 and 2, the friction coefficients were as small as 0.150 and 0.158, respectively, the sliding characteristics were excellent and the amounts of wear were 15 μm and 19 μm, respectively, which were about a half of those in Comparative Examples 1 to 10. Therefore, it was confirmed that the sliding members in Examples 1 and 2 were superior in wear resistance to those in Comparative Examples 1 to 10.

What is claimed is:

1. A wet sliding apparatus in which a multilayer sliding member is used in the presence of a lubricating oil, characterized in that the multilayer sliding member is composed of (1) a backing metal layer, (2) a porous, sintered layer provided thereon and (3) a surface layer consisting essentially of polyetheretherketone formed by impregnating and coating the porous, sintered layer (2) with a sliding resin consisting essentially of polyetheretherketone, and wherein the face roughness of the surface layer is 2 μm or less.

2. The wet sliding apparatus according to claim 1, wherein the surface of the surface layer is cut so as to have a face roughness of 2 μm or less.

3. The wet sliding apparatus according to claim 1, wherein the backing metal layer (1) is plated with a metal.

4. The wet sliding apparatus according to claim 1, wherein the backing metal layer (1) is plated with copper.

5. The wet sliding apparatus according to claim 1, which has a mechanism for feeding a lubricating oil onto the surface layer of the sliding member.

6. A wet sliding apparatus according to claim 1 wherein said surface layer is approximately 100% of said polyetheretherketone.

7. A sliding apparatus in which a multilayer sliding member is used in the presence of a lubricating oil, characterized in that the multilayer sliding member is composed of (1) a backing metal layer, (2) a porous sintered layer on said backing metal layer, (3) a surface layer consisting substantially entirely of polyetheretherketone on said porous sintered layer, said surface layer being formed by impregnating and coating said porous sintered layer with said polyetheretherketone, said surface layer being finished by cutting and having a face roughness no greater than 2 μm, said apparatus further comprising means for feeding lubricating oil onto said surface layer.

8. A sliding apparatus according to claim 7 wherein said multilayer sliding member is in cylindrical bush form.

9. A sliding apparatus according to claim 7 wherein said surface layer is substantially free of filler and PTFE.

* * * * *